(12) United States Patent
Chang

(10) Patent No.: US 6,206,033 B1
(45) Date of Patent: Mar. 27, 2001

(54) VALVE SAFETY LOCKOUT AND METHOD FOR USING

(75) Inventor: Chin-Chen Chang, Chu-Ba (TW)

(73) Assignee: Taiwan Semiconductor Manufacturing Company, Ltd., Hsin Chu (TW)

( * ) Notice: Subject to any disclaimer, the term of this patent is extended or adjusted under 35 U.S.C. 154(b) by 0 days.

(21) Appl. No.: 09/323,345

(22) Filed: Jun. 1, 1999

(51) Int. Cl.[7] ................................................. F16K 37/00
(52) U.S. Cl. ........................... 137/551; 137/377; 137/382
(58) Field of Search .................................. 137/377, 382, 137/559

(56) References Cited

U.S. PATENT DOCUMENTS

| | | | | |
|---|---|---|---|---|
| 3,696,964 | * | 10/1972 | Deakin | 220/728 |
| 3,722,533 | * | 3/1973 | Connolly | 137/382 |
| 4,301,828 | * | 11/1981 | Martin, Jr. | 137/381 |
| 4,405,161 | * | 9/1983 | Young et al. | 285/80 |
| 4,678,003 | * | 7/1987 | Griffin | 137/382 |
| 5,092,359 | * | 3/1992 | Wirth et al. | 137/382 |

* cited by examiner

Primary Examiner—A. Michael Chambers
Assistant Examiner—Thomas L. McShane
(74) Attorney, Agent, or Firm—Tung & Associates

(57) ABSTRACT

A valve safety lockout device and a method for using such device to tamper-proof a control valve are disclosed. In the device, a hollow toroidal-shaped body that is divided into two equal halves circumferentially forms the body for the lockout device. A plastic molded-in hinge connects the two equal halves at one end, and a male latch member and a female latch member are each formed at an opposite end of the two halves such that once they are engaged together, the two halves cannot be detached without destroying the latch members and thus making it visible to an operator. The plastic hollow body of the lockout device can be suitably molded of a plastic material of high rigidity including a molded-in plastic hinge connecting the two halves together. The rigidity of the plastic material should be such that the lockout device cannot be compressed or squeezed in order to turn the control valve handle.

20 Claims, 2 Drawing Sheets

VALVE SAFETY LOCKOUT AND METHOD FOR USING

FIELD OF THE INVENTION

The present invention generally relates to a device for locking a valve control handle and a method for using the device and more particularly, relates to a valve control handle safety lockout device for tamper-proving a valve handle once it is adjusted to an open or close position to prevent unauthorized adjustment of the handle and a method for using such valve control handle safety lockout device.

BACKGROUND OF THE INVENTION

In the fabrication of semiconductor devices, a semi-conducting wafer must be processed in a large number of processing steps for producing integrated circuit chips on the wafer. These processing steps may amount to as many as several hundred or more. The various processing steps are conducted in a variety of processing machines to carry out a large number of chemical or physical reactions on the semi-conducting wafer. In the various fabrication steps, a large variety of chemicals including gases and liquids are utilized either as raw materials in a deposition process, as dopants in an implantation process, as an etchant in a wet or dry etching process, or as a chemical reactant in any other processes.

Since a large number of chemicals utilized in a semiconductor fabrication facility are of the flammable or toxic nature, i.e., other than those inert gases normally utilized as purge or carrier gases, the storage and transporting of such chemicals are important aspects in the management of a fabrication facility. For instance, to avoid fire, explosion and serious personal injuries, a flammable or toxic gas must be securely stored in a safe storage facility. The storage of these gases is usually kept away from the plant personnel and thus, away from the processing equipment where they will be used. The transporting or delivery of these gases to a processing equipment therefore becomes another important aspect in the management of a fabrication plant.

A typical gas delivery system utilized in a semiconductor fabrication facility is shown in FIG. 1. The system 10 includes a main process gas input line 12 and a main purge gas supply line 14. A process gas, after being fed into the main process gas input line 12, is transported through a two-way air actuated valve 16 into a main process gas supply line 18. Off the main process gas supply line 18, a number of two-way, diaphragm-type (hereinafter, diaphragm) control valves 20 are utilized to feed the process gas from the main supply line 18 into a three-way diaphragm control valve 24. Into the three-way diaphragm control valve 24, a purge gas is also fed from the main purge gas supply line 26 into a second gas inlet 28 of the three-way diaphragm control valve 24. The purge gas, i.e., an inert gas, fed through the inlet 28 is then mixed with the process gas fed through the inlet 22 and outputted from outlet 32 of the three-way diaphragm control valve 24. It should be noted that in the above example, the purge gas is utilized as a carrier gas for the process gas. The purge gas may also be used alone for purging the gas line without the process gas. In such application, the three-way diaphragm control valve is adjusted such that only inlet 28 is connected to outlet 32 of the valve, while inlet 22 is shut-off.

When the purge gas is used as a carrier gas, the gas mixture is sent through a gas pressure regulator 36, a pressure transducer 38 into a second three-way diaphragm control valve 42 through inlet 40. The process gas/carrier gas mixture then exits from either outlet 46 or 48 and is fed into a process equipment. It should be noted that in FIG. 1, the process equipment and the gas lines feeding to the process equipment are not shown for simplicity reasons. When the gas outlets 46, 48 are not connected to a process equipment or to a gas delivery line, the outlets 46, 48 are capped by a cap 50. In the gas distribution system 10 shown in FIG. 1, the main process gas input line 18 is further provided with an expansion valve 60. The expansion valve 60 is provided such that other gas output lines may be connected thereto allowing future expansion of processing equipment in the fab facility. The outlets 62, 64 are also capped by caps 66 when the expansion valve 60 is not in use for add-on additional gas supply lines.

In the gas distribution system 10, it is seen that a number of two-way or three-way diaphragm-type control valves, i.e., 20, 24 and 42 are utilized for controlling the flow of various gases, including those of the flammable or toxic nature or vacuum in the supply lines. The control valves are equipped with control handles mounted on top of the valves such that a handle may be turned either clockwise or counterclockwise to close or open the gas passage. The control valves can be accidentally turned and thus releasing the vacuum in the line.

As shown in FIG. 1, when the gas line between the two control valves 20, 42 has been evacuated into a vacuum state, and that the main process gas supply line 18 is connected to a pressurized flammable gas supply, any accidental opening of the control valve 20 may cause the flammable gas to enter the gas line between valves 20 and 42. A flammable gas that is frequently utilized in a semiconductor fab plant is silane which readily ignites when mixed with air, or with oxygen in the air. Consequently, when cap 50 is later removed for connecting to a process equipment, the moment silane gas contacts the atmospheric air, a fore ignites in the gas line between valves 20, 42. If valve 20 has been left open, the fire propagates through the main process gas supply line 18 and causes further damages to other process gas feed lines and other process equipment.

The accidental opening or closing of valves can therefore cause serious consequences in a semiconductor fab plant that utilizes flammable or toxic gases. In the above described situation, even when the operator, after accidentally opened the control valve 20, subsequently closes it, a serious hazard has already been created in the gas line since it is now filled with a flammable gas that is unknown to other plant personnel. When the gas line is accidentally filled with a toxic gas, serious personal injuries can occur to a machine operator when cap 50 is subsequently removed for connecting to other gas lines or to a process equipment.

It has been found that accidental tampering with a gas control valves in the gas distribution system has been a main cause for serious fires in many semiconductor fab plants. Even when fire does not occur, serious personal injuries has occurred to machine operators when a gas line is accidentally filled with a toxic gas. An effective means to prevent such mishaps is therefore desperately needed in a semiconductor fab plant that utilizes a gas distribution system.

It is therefore an object of the present invention to provide a gas distribution/control system for use in a semiconductor fabrication facility that does not have the drawbacks or shortcomings of a conventional gas distribution/control system.

It is another object of the present invention to provide a gas distribution/control system in a semiconductor fabrication facility that can be easily implemented without making substantial modification to the plant equipment.

It is a further object of the present invention to provide a gas distribution/control system in a semiconductor fabrication facility that can be effectively used without accidental opening/closing of control valves.

It is another further object of the present invention to provide a valve safety lockout device that can be made readily available in a semiconductor fabrication facility.

It is still another object of the present invention to provide a valve safety lockout device that can be utilized at low cost to effectively prevent accidental opening/closing of valves.

It is yet another object of the present invention to provide a valve control handle safety lockout device that can be used to lock a valve control handle so that any tampering of the lockout device can be easily identified.

It is still another further object of the present invention to provide a method to safety lockout a valve control handle by locking a single use lockout device onto a valve control handle while allowing visual inspection of the opening/closing status of the handle.

It is yet another further object of the present invention to provide a safety lockout device for a valve control handle that is fabricated in rigid plastic such that after mounting to a control handle, the device can stand up to compressive forces placed on the device without affecting the control handle.

SUMMARY OF THE INVENTION

In accordance with the present invention, a valve safety lockout device and a method for utilizing such device are disclosed.

In a preferred embodiment, a valve safety lockout device is provided which includes a hollow toroidal-shaped body divided in two equal halves of a first half and a second half, a hinge connecting the two equal halves at one end, a male latch member formed at an opposite end of the first half, a female latch member formed at an opposite end of the second half for un-detachably latching onto the male latch member on the first half, and a cavity in the hollow toroidal-shaped body when the first half and the second half are un-detachably latched together to provide a safety lockout for a valve control handle.

In the valve safety lockout device, the hollow toroidal-shaped body may be molded in a plastic material, or may be molded in a plastic material of high rigidity. The male latch member on the first half and the female latch member on the second half once latched together, can only be separated by destroying the latch members.

The valve safety lockout device may further include a top flange and a bottom flange connected by a circumferential sidewall forming the hollow toroidal-shaped body. The top flange may contain a window therein allowing the visual inspection of the opening/closing status of the valve control handle. The bottom flange may further include a collar formed in a perpendicular direction for surrounding the handle and for stabilizing the valve safety lockout when mounted on the valve control handle. The hinge connecting the two equal halves at one end may be a molded-in plastic hinge.

The present invention is further directed to a method for safety lockout a valve control handle which can be carried out by the operating steps of first providing a hollow toroidal-shaped body divided into two equal halves of a first half and a second half, a hinge connecting the two equal halves at one end, a male latch member formed at an opposite end of the first half, a female latch member formed at an opposite end of the second half for un-detachably latching onto the male latch member on the first half, and a cavity in the hollow toroidal-shaped body when the first half and the second half are un-detachably latched together, then positioning the hollow toroidal-shaped body over a valve control handle, and engaging the male latch member to the female latch member such that the two members are un-detachably latched together enclosing the valve control handle in the cavity.

The method to safety lockout a valve control handle may further include the step of molding the hollow toroidal-shaped body in a plastic material of high rigidity. The method may further include the step of providing a hinge connecting the two equal halves together in a molded-in plastic hinge. The method may further include the step of unlocking the safety lockout from the valve control handle by destroying the male latch member and the female latch member by a tool. The method may further include the step of turning the safety lockout freely on the valve control handle and compressing by hand without being able to turn the valve control handle.

In another preferred embodiment, a safety lockout device for a valve control handle can be provided which includes a hollow donut-shaped body formed in a first half and a second half divided circumferentially in equal size, a built-in hinge connecting the first half and the second half at one end, a male latch member at an unconnected end of the first half, a female latch member at an unconnected end of the second half adapted for un-detachably latching to the male latch member, and a top flange, a bottom flange connected therein between by a circumferential sidewall forming the hollow donut-shaped body and a cavity therein sufficiently large to accommodate the valve control handle.

In the safety lockout device for a valve control handle, the top flange contains a window of sufficient size for allowing visual inspection of the open/close status of the valve control handle. The bottom flange may further include a collar formed in a perpendicular direction for surrounding a shaft of the valve control handle and for stabilizing the valve safety lockout device when mounted on the valve control handle. The hollow donut-shaped body may be molded in a plastic material, or in a plastic material of high rigidity. The male latch member on the first half and the female latch member on the second half once latched together, the two halves can only be separated by destroying the latch members by a tool. The hinge connecting the two equal halves at one end may be a molded-in plastic hinge.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1:
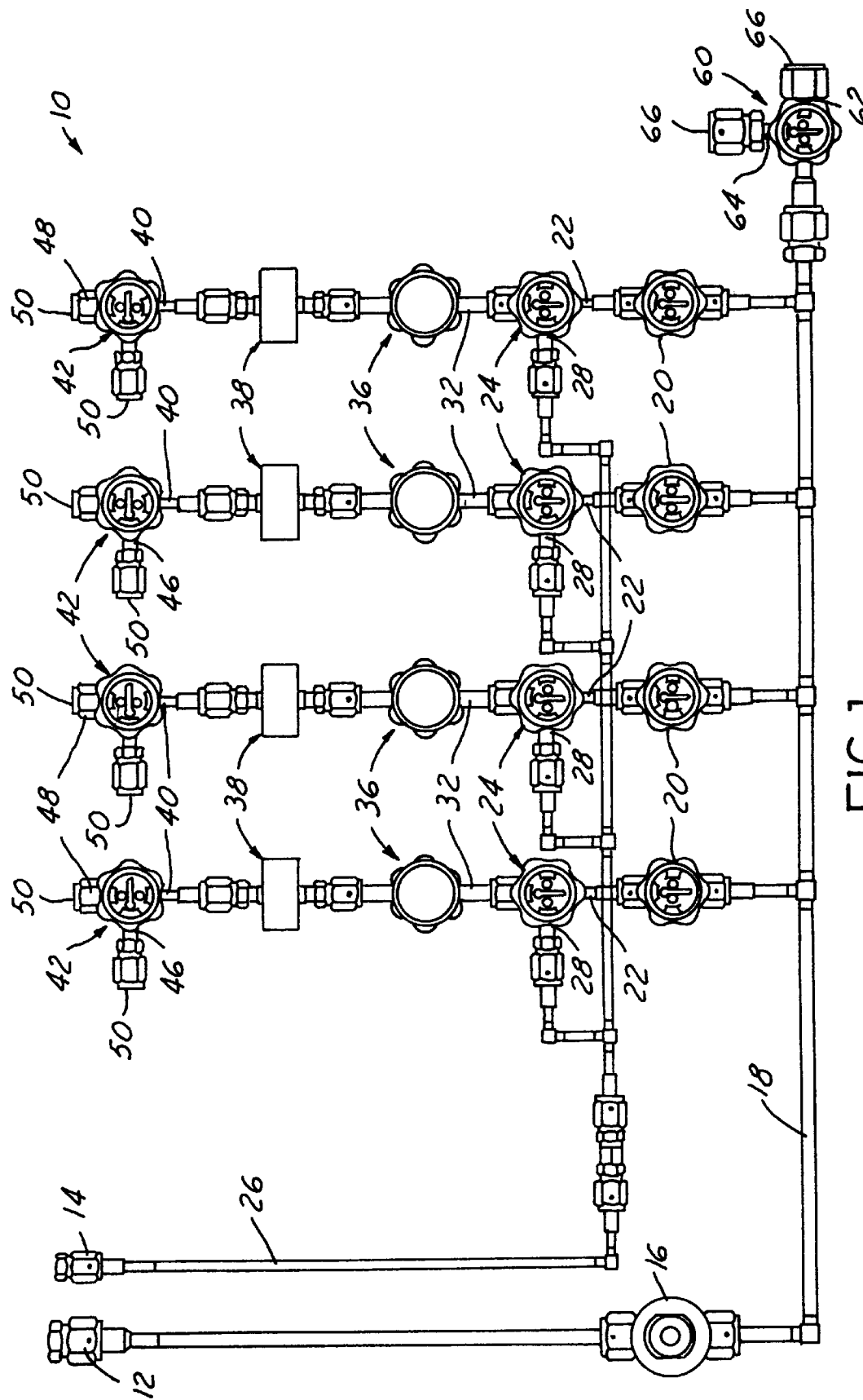
FIG. 1 is a schematic illustrating a conventional gas distribution/control system utilized in a semiconductor fabrication facility.

The present invention discloses a valve control handle safety lockout device that can be used advantageously in a gas distribution/control system in any factory environment, and is particularly suitable for use in a semiconductor fabrication facility. The safety lockout device can be used for one-time only by locking un-detachably two halves of a hollow donut-shaped body of the lockout device onto a valve control handle. Once locked, the lockout device can only be removed by a tool by destroying the latching means provided on the device. The safety lockout device can be advantageously molded in a plastic molding tool of a plastic material that has high rigidity. The two halves can be connected by a living hinge, or a molded-in plastic hinge.

The present invention valve control handle safety lockout device, once engaged on a control handle, prevents the accidental opening/closing or tampering of the gas control valve such that an intended status in the gas line controlled by the valve is not altered. The only way to access the control valve, when the lockout device is mounted thereon, is to destroy the lockout device such that it is obvious that the valve has been tampered with.

The present invention valve safety lockout device is most suitably used in a semiconductor fabrication facility where highly flammable or toxic gases are frequently used. The present invention novel device therefore prevents the accidental entering into a gas line of a flammable gas which presents a serious fire hazard when the flammable gas comes in contact with atmospheric air. The present invention novel valve safety lockout device further prevents serious personal injuries from occurring to plant personnel when toxic gases flow into a gas line without anyone's knowledge due to accidental opening of a control valve.

Operator's mistakes in the accidental opening/closing of gas control valves has been determined as the single, most frequent occurred cause for serious plant hazards. Serious plant fires, explosions, contamination to the processing equipment and personal injuries can be avoided by utilizing the present invention novel valve control safety lockout device. The present invention safety lockout device can be advantageously molded in a plastic material and thus produced in a low cost manner. The color of the safety lockout device can be of a bright color such as red to alert plant personnel the critical nature of the lockout device. The plastic material normally utilized to mold the safety lockout device should have enough rigidity such that, after mounted to a gas valve handle, the lockout device cannot be compressed or squeezed onto the valve handle to enable the turning of the handle. The rigidity of the plastic further protects the lockout device from being accidentally removed upon impact.

The latching means on the lockout device is designed such that a female latch member can be un-detachably engaged to a male latch member. Once latched together, the safety lockout device can only be opened and removed by destroying the latch means by a tool. Any tampering of the safety lockout device can therefore be easily spotted by visual examination. The cavity in the hollow lockout device is sufficiently large to accommodate a valve control handle. Furthermore, the upper flange of the lockout device contains a window that is sufficiently large for an operator to visually inspect the open/close status of the valve.

Figure 2:
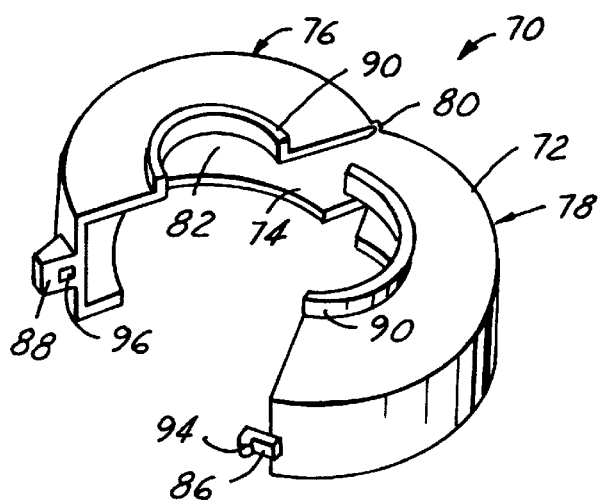
FIG. 2 is a perspective view of the bottom side of the present invention valve safety lockout device.
Figure 3:
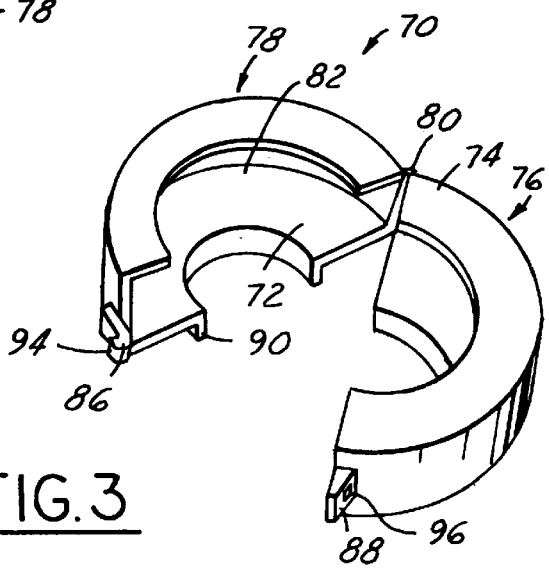
FIG. 3 is a perspective view of the top side of the present invention valve safety lockout device.

Referring now to FIG. 2, wherein a present invention lockout device 70 is shown. The perspective view shown in FIG. 2 illustrates the bottom flange 72 on top. A similar perspective view of the lockout device 70 is shown in FIG. 3 with the top flange 74 on top. As shown in FIGS. 2 and 3, the present invention novel valve safety lockout device 70 is constructed in two equal halves 76 and 78 that are connected together by a living hinge 80 formed in a plastic injection molding process. Each of the two halves, 76, 78 is formed in a hollow, toroidal-shape or a donut-shape such that a cavity 82 is provided therein between. It should be noted that the bottom flange 72 has a larger width than the top flange 74 such that a larger window is exposed in the top flange 74 when the two halves 76, 78 are latched together by the male latch member 86 and the female latch member 88. The bottom flange 72 is further equipped with a collar 90 that is formed extending outwardly from the inner edge of the bottom flange in a perpendicular direction. The function of the collar 90 is to provide stability when the lockout device 70 is mounted onto the shaft of a control valve, as shown in FIG. 5.

Figure 4:
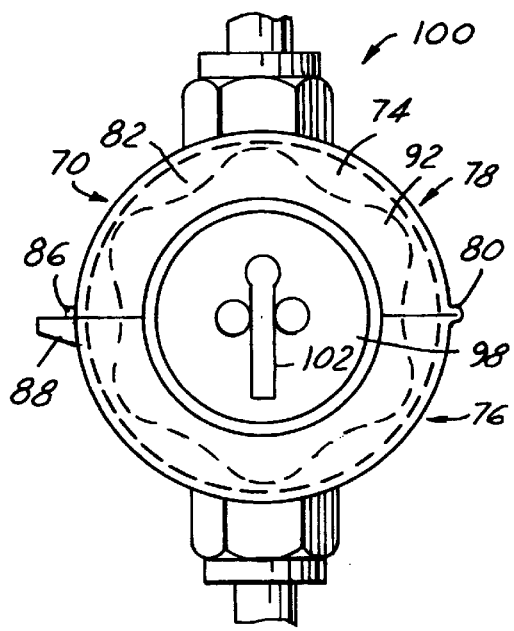
FIG. 4 is a plane view of the present invention valve lockout device installed on a two-way diaphragm control valve.

As shown in FIGS. 2 and 3, the present invention novel valve safety lockout device 70 can be advantageously molded in a low cost injection molding process such that the lockout device can be a single use and disposable item in a fab plant. The lockout device 70 should be molded by a plastic material that has sufficient rigidity such that after the device is mounted on a control valve handle, as shown in FIGS. 4, 5 (on a two-way diaphragm control valve 100), the lockout device 70 can not be squeezed or compressed to turn the handle 92. The handle 92 is shown in ghost lines in FIG. 4.

The latch means, or the male latch member 86 and the female latch member 88 are designed such that the male latch member 86 is equipped with a one-way hook 94 which when penetrates the aperture 96 in the female latch member 88, locks on to the female latch member 88 and can not be detached. The only way of separating the two lockout device halves 76, 78 after they are latched together is to destroy the male latch member 86 and the female latch member 88. The latch members 86, 88 can be easily engaged by pressing the two halves 76, 78 toward each other until the latch members are locked together. When the latch members 86, 88 are destroyed in order to separate the two halves 76, 78, it is easily identifiable that the valve control handle has been tampered with and thus alerting an operator to the possible presence of a flammable or toxic gas in the gas line.

Figure 5:
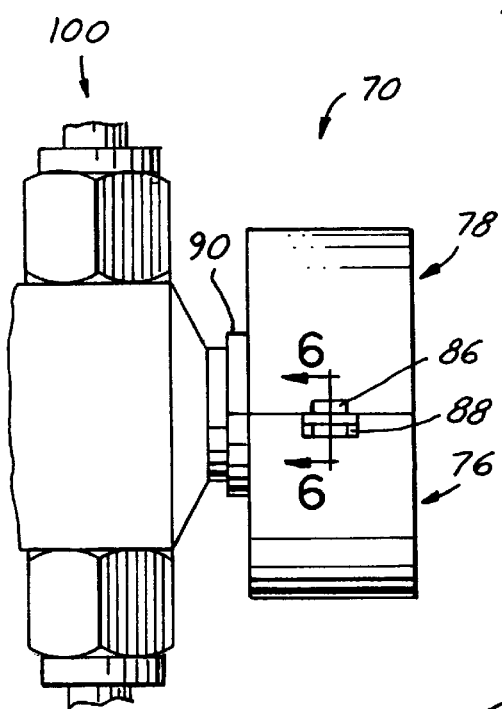
FIG. 5 is a side view of the present invention valve safety lockout device mounted on a two-way control valve shown in FIG. 4.

FIGS. 4 and 5 illustrate an application of the present invention novel valve lockout device 70 onto a two-way diaphragm-type control valve 100. It is noticed that the two halves 76 and 78 are engaged together by the male latch member 86 and the female latch member 88. The cavity 82 formed in the hollow toroidal-shaped body is sufficiently large for accommodating the valve control handle 92 on the two-way control valve 100. The opening 98 in the top flange 74 is sufficiently large such that the open/close status of the valve control handle 92 can be easily identified. For instance, a marking 102 shown in FIG. 4 illustrates an open position of the two-way control valve 100.

Figure 6:
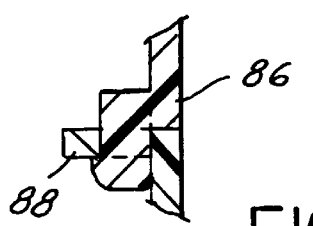
FIG. 6 is an enlarged view taken from lines 6—6 of FIG. 5 illustrating a female latch member engaged with a male latch member.

An enlarged, cross-sectional view taken along line 6—6 of FIG. 5 showing the locking engagement between the male latch member 86 and the female latch member 88 is shown in FIG. 6.

The present invention novel valve safety lockout device and a method for using such device have therefore been amply described in the above descriptions and in the appended drawings of FIGS. 2~6.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the invention.

The embodiment of the invention in which an exclusive property or privilege is claimed are defined as follows:

What is claimed is:

1. A valve safety lockout comprising:
   a hollow toroidal-shaped body divided in two equal halves of a first half and a second half,
   a hinge connecting the two equal halves at one end,
   a male latch member formed at an opposite end of said first half,
   a female latch member formed at an opposite end of said second half being configured for un-detachably latching onto said male latch member on said first half, and
   a cavity in said hollow toroidal-shaped body when said first half and said second half are un-detachably latched together to provide a safety lockout for a valve control handle.

2. A valve safety lockout according to claim 1, wherein said hollow toroidal-shaped body is molded of a plastic material.

3. A valve safety lockout according to claim 1, wherein said hollow toroidal-shaped body is molded of a plastic material of high rigidity.

4. A valve safety lockout according to claim 1, wherein said male latch member on the first half and said female latch member on the second half once latched together, the two halves can only be separated by destroying the male and female latch members.

5. A valve safety lockout according to claim 1 further comprising a top flange and a bottom flange connected by a sidewall forming sad hollow toroidal-shaped body.

6. A valve safety lockout according to claim 5, wherein said top flange contains a window therein for visual inspection of the state of open/close of a valve control handle.

7. A valve safety lockout according to claim 5, wherein said bottom flange further comprising a collar formed in a perpendicular direction for surrounding a shaft of said valve control handle and for stabilizing said valve safety lockout when mounted on the valve control handle.

8. A valve safety lockout according to claim 1, wherein said hinge connecting the two equal halves at one end is a molded-in plastic hinge.

9. A method to safety lockout a valve control handle comprising the steps of:
   providing a hollow toroidal-shaped body divided in two equal halves of a first half and a second half, a hinge connecting the two equal halves at one end, a male latch member formed at an opposite end of said first half, a female latch member formed at an opposite end of said second half being configured for un-detachably latching onto said male latch member on said first half, and a cavity formed in said hollow toroidal-shaped body when said first half and said second half are un-detachably latched together,
   positioning said hollow toroidal-shaped body over a valve control handle and
   engaging said male latch member to said female latch member such that said two members are un-detachably latched together enclosing said valve control handle in said cavity.

10. A method to safety lockout a valve control handle according to claim 9 further comprising the step of molding said hollow toroidal-shaped body in a plastic material of high rigidity.

11. A method to safety lockout a valve control handle according to claim 10 further comprising the step of providing said hinge connecting the two equal halves in a molded-in plastic hinge.

12. A method to safety lockout a valve control handle according to claim 9 further comprising the step of unlocking said safety lockout from said valve control handle by destroying said male latch member and said female latch member by a tool.

13. A method to safety lockout a valve control handle according to claim 9 further comprising the step of turning said safety lockout freely on said valve control handle and compressing by hand without being able to turn said valve control handle.

14. A safety lockout device for a valve control handle comprising:
   a hollow donut-shaped body formed in a first half and a second half divided circumferentially in equal size,
   a built-in hinge connecting the first half and the second half at one end,
   a male latch member at an unconnected end of said first half,
   a female latch member at an unconnected end of said second half being configured for un-detachably latching to said male latch member, and
   a top flange, a bottom flange connected therein between by a circumferential sidewall forming said hollow donut-shaped body and a cavity therein sufficiently large to accommodate said valve control handle.

15. A safety lockout device for a valve control handle according to claim 14, wherein said top flange contains a window of sufficient size for allowing visual inspection of the open/close status of said valve control handle.

16. A safety lockout device for a valve control handle according to claim 14, wherein said bottom flange further comprising a collar formed in a perpendicular direction for surrounding a shaft of said valve control handle and for stabilizing said valve safety lockout when mounted on the valve control handle.

17. A safety lockout device for a valve control handle according to claim 14, wherein said hollow toroidal-shaped body is molded in a plastic material.

18. A safety lockout device for a valve control handle according to claim 14, wherein said hollow toroidal-shaped body is molded in a plastic material of high rigidity.

19. A safety lockout device for a valve control handle according to claim 14, wherein said male latch member on the first half and said female latch member on the second half once latched together, the two halves can only be separated by destroying said male and female latch members.

20. A safety lockout device for a valve control handle according to claim 14, wherein said hinge connecting the two equal halves at one end is a molded-in plastic hinge.

* * * * *